No. 732,984. PATENTED JULY 7, 1903.
G. W. WHITTINGTON.
WIRE FENCE WEAVING MACHINE.
APPLICATION FILED JUNE 13, 1902.
NO MODEL. 6 SHEETS—SHEET 1.

WITNESSES:
W. L. Bushong.
Nellie Allemong.

INVENTOR
George W. Whittington.
BY
V. H. Lockwood
ATTORNEY

No. 732,984. PATENTED JULY 7, 1903.
G. W. WHITTINGTON.
WIRE FENCE WEAVING MACHINE.
APPLICATION FILED JUNE 13, 1902.
NO MODEL. 6 SHEETS—SHEET 2.

WITNESSES:
W. L. Bushong.
Nellie Allemong.

INVENTOR
George W. Whittington
BY
V. H. Lockwood
ATTORNEY

THE NORRIS PETERS CO., PHOTO-LITHO., WASHINGTON, D. C.

No. 732,984. PATENTED JULY 7, 1903.
G. W. WHITTINGTON.
WIRE FENCE WEAVING MACHINE.
APPLICATION FILED JUNE 13, 1902.
NO MODEL. 6 SHEETS—SHEET 3.

WITNESSES:
W. L. Bushong
Nellie Allemong

INVENTOR
George W. Whittington.
BY
V. H. Lockwood.
His ATTORNEY

No. 732,984. PATENTED JULY 7, 1903.
G. W. WHITTINGTON.
WIRE FENCE WEAVING MACHINE.
APPLICATION FILED JUNE 13, 1902.

NO MODEL. 6 SHEETS—SHEET 4.

WITNESSES:
W. L. Bushong.
Nellie Allemong.

INVENTOR
George W. Whittington
By V. H. Lockwood, ATTORNEY

THE NORRIS PETERS CO., PHOTO-LITHO., WASHINGTON, D. C.

No. 732,984. PATENTED JULY 7, 1903.
G. W. WHITTINGTON.
WIRE FENCE WEAVING MACHINE.
APPLICATION FILED JUNE 13, 1902.
NO MODEL. 6 SHEETS—SHEET 6.

WITNESSES:
INVENTOR
George W. Whittington
BY
V. H. Lockwood
ATTORNEY

No. 732,984. Patented July 7, 1903.

UNITED STATES PATENT OFFICE.

GEORGE W. WHITTINGTON, OF INDIANAPOLIS, INDIANA.

WIRE-FENCE-WEAVING MACHINE.

SPECIFICATION forming part of Letters Patent No. 732,984, dated July 7, 1903.

Application filed June 13, 1902. Serial No. 111,521. (No model.)

*To all whom it may concern:*

Be it known that I, GEORGE W. WHITTINGTON, of Indianapolis, county of Marion, and State of Indiana, have invented a certain new and useful Wire-Fence-Weaving Machine; and I do hereby declare that the following is a full, clear, and exact description thereof, reference being had to the accompanying drawings, in which like characters refer to like parts.

The object of this invention is to provide a practical machine for the manufacture and weaving of what is known as the "V-mesh fence." This machine is an improvement over that shown in my former patent, dated July 25, 1899, No. 629,637, and that shown in my application filed August 26, 1901, Serial No. 73,316.

The nature of my improvements in this machine will be understood from the accompanying drawings and the following description and claims.

The frame of the machine is composed of two end pieces 1 and 2, a connecting rear beam 3, (shown in Figs. 6 and 19,) the said connecting-beam being secured by bolts 4, and the upper and lower twister-plates 5 and 6, the former, 5, having its ends secured to the top of the end frames 1 and 2 and the latter, 6, secured at one end to the inside supporting-bracket 7 on the end frame 1 by means of bolts and the other end secured on a part of the end piece 2.

The end frame 1 carries a driving-pulley 8 by means of a spindle 9, having an inwardly-projecting hub on which is secured a pinion 11, which engages a gear-wheel 12, having on its outer face a mutilated bevel-gear 13 and all being mounted on the shaft 14, so as to rotate in the direction indicated by the arrow. The bevel-gear 13 rotates continuously and intermittently drives the bevel-pinion 15 and its shaft 16. The arrangement of the mutilated bevel-gear 13 is such that while it makes one-half of a revolution the pinion will make two complete revolutions, when by reason of the mutilated portion of the bevel-gear the pinion 15 will cease rotating. That the pinion 15 and its shaft 16 and the mechanism connected therewith be held at rest during the period of the disengagement of the bevel-gear 13, one end of the shaft 16 has a square head 17, adapted to be engaged by the semicircular cam 18, formed on the side of the wheel 12 and in engagement with the head 17 while the latter is at rest. The cam 18 commences to engage the head 17 as the last tooth of the gear 13 disengages the pinion 15, and the head 17 disengages the cam as the first tooth of the bevel-gear engages the pinion 15.

The shaft 16 is journaled in boxes 19 on the end frame 1. On this shaft between its ends a pinion 20 is mounted, that engages a spur-wheel 21 on the shaft 22, having journal-bearings in boxes 23 and 29.

The ratio of the diameters of the pinion and wheel is preferably one to four, that the pinion may make two revolutions to a half-revolution of the wheel during one period of time and during the next equal period be at rest.

Figure 1:
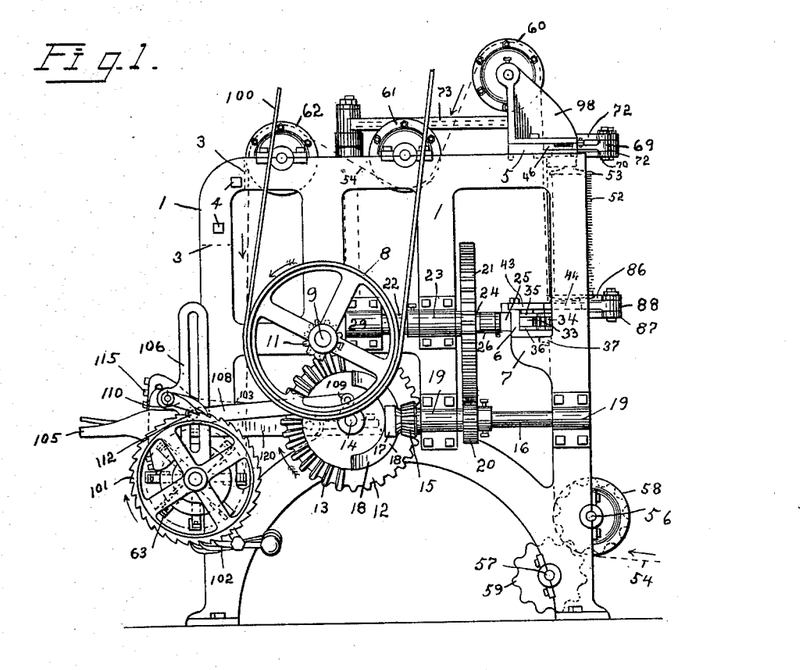
Figure 1 is a left end elevation of the machine.
Figure 2:
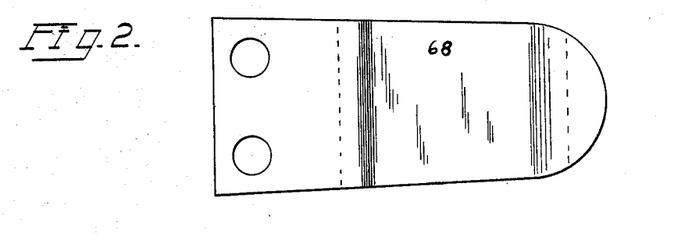
Fig. 2 is a plan view of one of the guides for the drag-plates as it appears detached.
Figure 3:
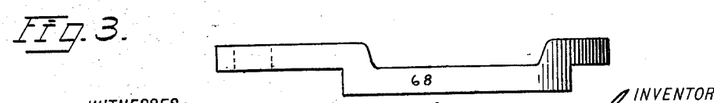
Fig. 3 is a side elevation of what is shown in Fig. 2.
Figures 7, 8, 9, 10, 11, 12, 13, 14:
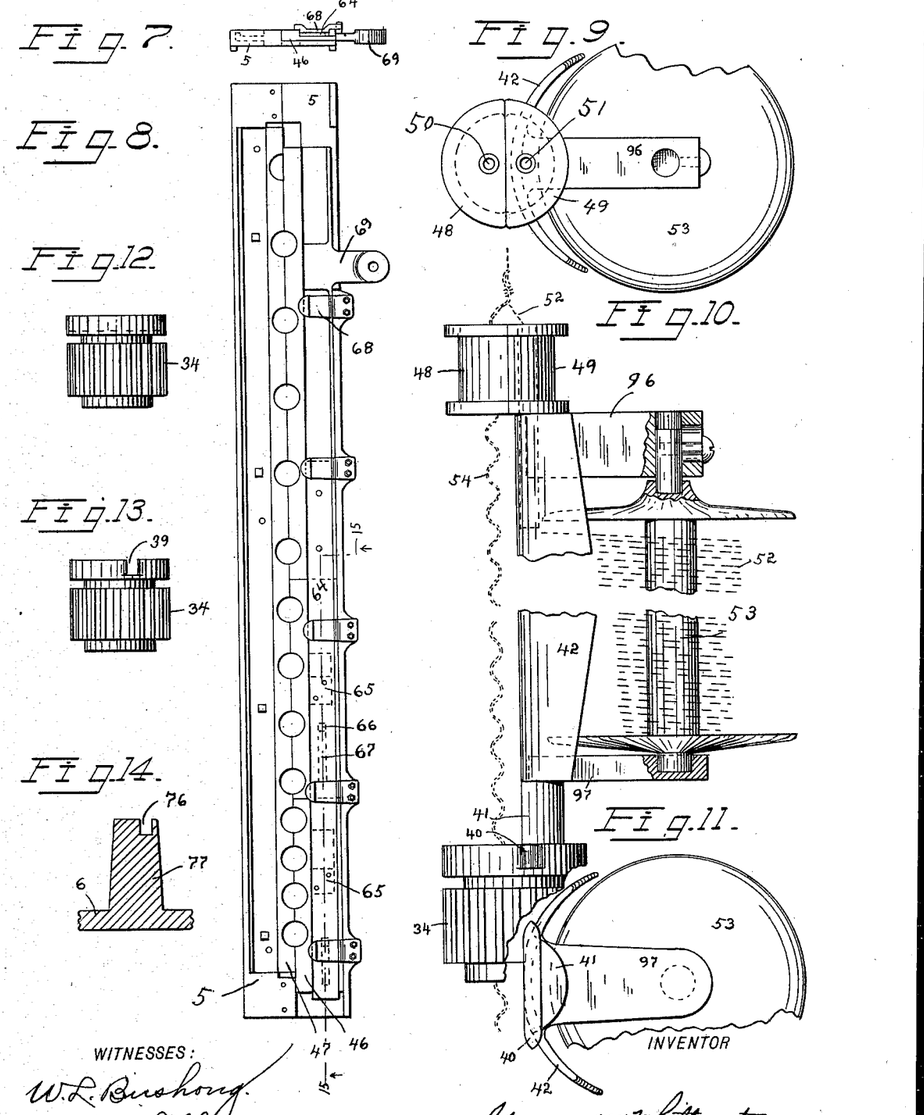
Fig. 7 is an end elevation of the twister and drag plates.
Fig. 8 is a plan view thereof.
Fig. 9 is a plan view of a spool-holder and wire-twister with a portion broken away.
Fig. 10 is a side elevation of a spool and a spool-holder and a wire-twister and a twister-wheel, parts being broken away.
Fig. 11 is a bottom view of the same, partly broken away.
Figs. 12 and 13 are elevations of the twister-wheel in two different positions of rotation.
Fig. 14 is a vertical section of the support and guide for the spool-holder.
Figure 19:
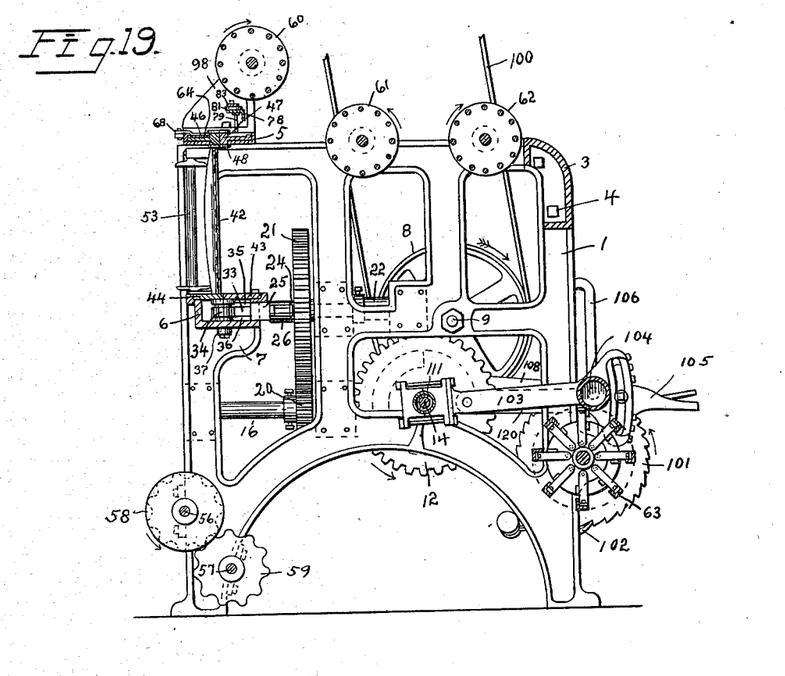
Fig. 19 is a section on the line 19 19 of Fig. 6.
Figure 20:
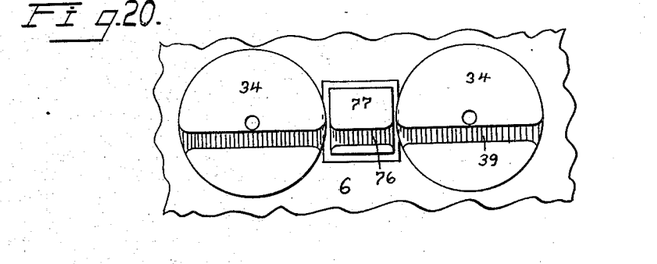
Fig. 20 is an enlarged plan of means for guiding the spool-holders in their lateral movement.

The wheel 21 has a crank-pin 24 on the right-hand side, as shown in Fig. 1, from which motion is imparted through the connecting-rod 26 to a sliding block 25, and the sliding block 25 reciprocates in a horizontal slot in the side of the lower twister-plate 6, the position of the two parts being shown in Fig. 19. The block 25 is secured to the rack-bar 33. Above and below the rack-bar there are guide-strips 35 and 36, which extend to the left, as shown in Fig. 19, far enough to enter the peripheral grooves above and below the spur-gear of twister-wheels 34, which are shown in Figs. 12 and 13. Said twister-wheels are provided with a spur-gear intermediate the grooves referred to, which meshes with the rack on the bar 33, and the twister-wheels are thereby rotated. The guide-strips 35 and 36 therefore serve to insure the proper meshing of the teeth and at the same time prevent the twister-wheels from climbing on their bearing-studs 37, the latter vertically secured in the bottom of the twister-plate 6 at such relative distances apart as the style of the fence may require. The arrangement of these parts is substantially the same as that shown in Figs. 10 to 14 of my patent above mentioned. The twister-wheels 34 are provided with central axial holes for the passage of the running-wires of the fence. The axial hole in the twister-wheel appears in Fig. 20, and the wire passing through appears in dotted lines, Fig. 10.

The top surfaces of the twister-wheels 34 are each provided with a groove 39 (see Figs. 13 and 20) to receive the bottom guide-lugs 40 on the under surfaces of the journals 41 of the spool-holders 42. (Shown in Fig. 10.) Said journals 41 have bearings in the drag-plate 43 and stationary plate 44, while the upper ends of the spool-holders are integral with one-half the wire-twisters. These wire-twisters are cylindrical and formed of two independent semicircular halves 48 and 49. The half 48 rests while not rotating in the semicircular notches in the stationary plate 47, while the half 49 fits in the notches of the drag-plate 46. Between the pairs of opposite plates 43 and 44 below and 46 and 47 above said spool-holders are revolved either to the right or to the left to twist the cross-wires around the running-wires of the fence.

The wire-twisters 48 and 49 are journaled, as above explained, in the upper twister-plate 5 and are equal in number to and directly above the twister-wheels 34, from which motion is imparted to said wire-twisters 48 and 49 through the movement of the spool-holders 42. The wire-twisters are provided with a pair of vertical pipes 50 and 51, extending through the twisters at the opposite sides of the centers. (See Figs. 9 and 10.) Through the pipe 51 a straight wire 52 passes upward as it unwinds from the spool 53. This wire constitutes the cross-wire in the fence. Through the pipe 50 a crimped wire 54 passes upward from the crimpers near the bottom of the machine, which will be hereinafter explained. The crimped wires 54 constitute the running-wires of the fence.

Figure 4:
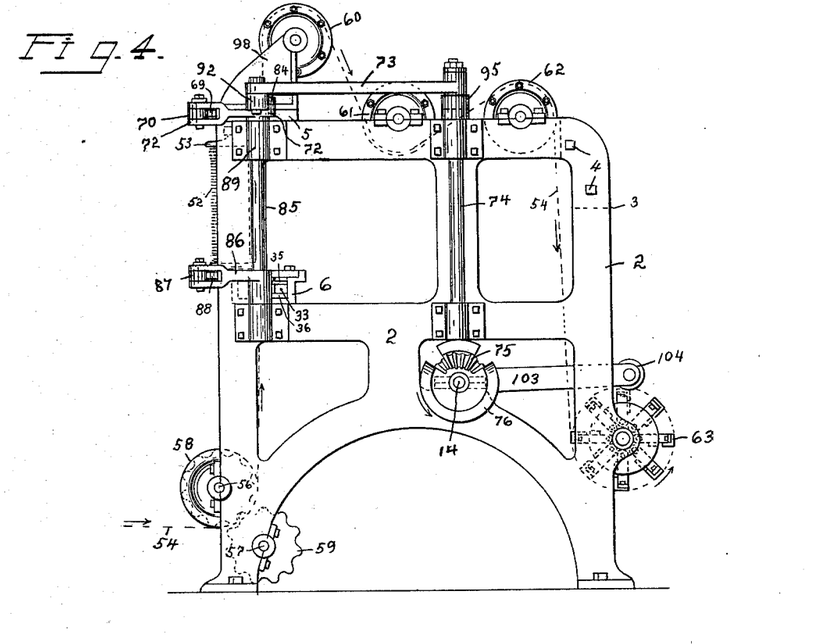
Fig. 4 is a right end elevation of the machine opposite to that shown in Fig. 1.

The crimping of the wire 54 will be understood from the following description: At the bottom of the machine, at the front side or left, as shown in Figs. 4 and 19, are two horizontal shafts 56 and 57, each mounted in the frame of the machine, the shaft 56 being above and somewhat to the front of the shaft 57. Upon the shaft 56 there are secured at regular intervals or spaces the crimping-wheels 58, and upon the shaft 57 there are crimping-wheels 59 secured, that correspond and coöperate with the crimping-wheels 58 to crimp the running-wires 54, as shown in dotted lines in Figs. 4 and 6. So far as this machine is concerned the exact construction and form of the wheels 58 and 59 with relation to each other is immaterial, so long as they crimp the wire that passes through them and at the same time hold the wire under tension. The wheel 58 is provided with circumferential recesses, as herein shown, while the wheel 59 is provided with projections or teeth that register with said recesses, and thereby crimp the wire. In weaving a fence a number of long wires 54 are necessary, and upon the shafts 56 and 57 there are as many pairs of crimping-wheels 58 and 59 as are necessary to crimp the number of running-wires desired in the fence. In the machine here shown (see Fig. 6) there are fourteen pairs of crimping-wheels. Hence such machine will make a fence with fourteen running-wires. It is noted also that the desired spaces between the running-wires of the fence are predetermined by the spaces between the pairs of crimping-wheels. With the machine shown if the spacing of the running-wires is to be changed, say, to accommodate a seven-wire fence the end is accomplished by not passing through some of the crimping-wheels. Thus the wires could be omitted from every other pair of crimping-wheels or omitted from one-half of the crimping-wheels at either end of the series, according to the make of fence desired.

The wire 54 is drawn from some spool or supply outside of the machine and between the crimping-wheels by parts of the machine hereinafter explained. There is no other means than the movement of the wire 54 for rotating the crimping-wheels. Since the crimping-wheels are all rotatably secured on the same shafts and are of the same dimensions, they will rotate with uniformity, whereby the fence can be made perfectly straight.

The wires 54 pass upward from the crimping-wheels through the vertical axial holes in the bearing-studs 37 and the twister-wheels 34, and thence up through the pipe 50 of the wire-twisters 48, and thence up over the front side of the roller 60, down and under the roller 61, up over the roller 62, and down to the reel 63, upon which the completely-woven fence is wound. The roller 60 is horizontally mounted on the brackets or posts 98 at the top of the machine. The roller 61 is horizontally mounted in suitable bearings on the top of the main frame near the middle. The roller 62 is similarly mounted at the top of the frame near the rear side.

The wire fence is woven before it reaches the first roller 60 of the above-mentioned series of rollers. Having explained whence the two strands of wire 52 and 54 come, the former loosely from the spools 53 and the latter tautly from the crimping-wheels 58 and 59, I will proceed to explain how the said wires are interwoven to form the fence. The spools 53 are vertically and loosely mounted rotatably in the arms 96 and 97 of the spool-holder 42. The spool-holder is provided with a plate that is wide and tapering transversely and convex on the side next to the running-wire 54, as appears in Figs. 9 and 11, to prevent the running-wire from catching on the spool-holder during the operation of the machine.

Figure 5:
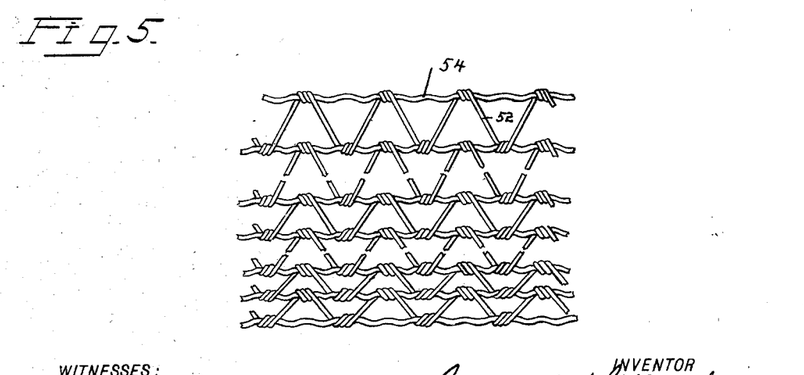
Fig. 5 is an elevation of a portion of the woven-wire fence that is manufactured by this machine.
Figure 6:
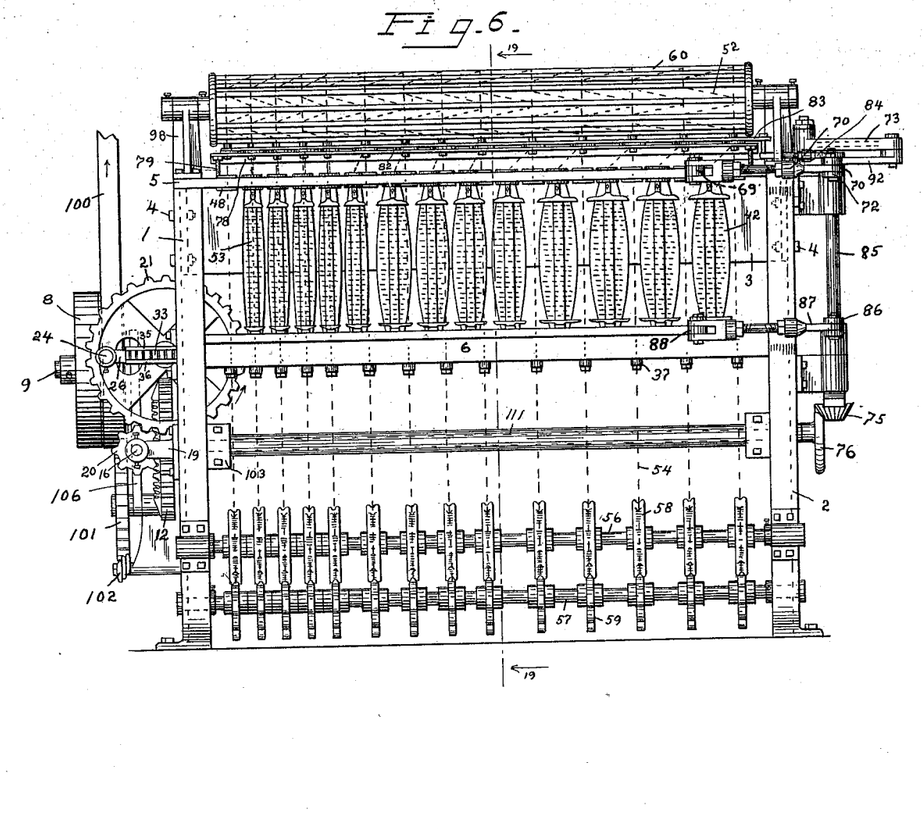
Fig. 6 is a front elevation of the machine, being the right-hand side of Fig. 1 and the left-hand side of Fig. 4.

By turning Fig. 5 sidewise, so that the position of the running-wires in the fence there shown will correspond with the position of the running-wires dotted in Fig. 6, the operations of the machine may be more clear, although Fig. 5 shows a fence with only seven running-wires instead of fourteen, as might be made with the machine as shown in Fig. 6. When the wires, as shown in Fig. 10, are brought together, they are twisted by reason of two rotations of the spool-holder. These two rotations of the spool-holder and also the wire-twisters 48 and 49 are caused by the movement of the rack-bar 33. The rack-bar 33 is moved sufficiently far by a one-half rotation of the wheel 21. As explained before, the wheel 21 moves the rack-bar 33 by acting through the parts 25 and 26 and then the wheel 21, and therefore the rack 33 and spool-holder cease operation by reason of the mutilation of the gear 13. This operation twists the wire 52 around the wire 54 two times, as shown at the various joints of the fence in Fig. 5. During the period of non-rotation of the spool-holder the whole series of spool-holders are shifted laterally by the lateral movement of the lower drag-plate 44 and the upper drag-plate 46. For example, such shifting would cause the plate 46, as shown in Fig. 8, to be shifted laterally, so that each notch in the plate 46 would register with the notch beyond it—that is, in the stationary plate 47—and therefore the portion 49 of the wire-twister through which the cross-wire 52 extends would be moved laterally away from the part 48 of the wire-twister with which it had coöperated in the previous step of the process into juxtaposition with part 48 in the wire-twister next beyond. Since the wire-twister is centrally split and the part 48 is not slidable, the other part 49 is readily moved laterally one step to the next wire-twister. This causes the wire-twister that wrapped the wire 52 around the running-wire 54—say at the top of Fig. 5—to be moved across to the next running-wire 54, and then the same twisting process is repeated which has been explained to make the two laps of the wire 52, and then the spool-holders and part 49 of the wire-twisters are moved back again, so as to bring them into position to wrap again the wire 52 around the wire 54 at the top of Fig. 5, and the plate 46 in effecting this returns to the position shown in Fig. 8. Thus as the wire fence is woven each wire-twister moves to and fro between the running-wires 54 and wraps the wire 52 first about one and then the other successively, and since the reel 63 draws the running-wires 54 through the machine during the twisting operation the wrapping of the cross-wire 52 around first one wire 54 and then the adjacent wire 54 is progressive and diagonal, as shown in Fig. 5, and thereby the fence commonly known as the "V-mesh" is formed.

In order that the bearing-notches in the plates 46 and 47 for the wire-twisters 48 and 49 may register when said plate 46 is shifted, and yet it be possible to make a wire fence with the running-wires separated for variable distances, said plate 46 is made sectional, it being shown in three sections in Fig. 8, and the bearing-notches for each section are equidistant from each other. The upper section or longer section, as shown, has secured upon it the plate 64, by the movement of which the parts of the bar 46 are shifted. It directly and immediately moves the upper or main portion of the drag-plate 46, and at its inner end, as shown in Figs. 8 and 19, a block 65 is secured which moves in a slot in the middle section of the drag-plate 46 until after the other and larger section of the drag-plate has been moved some distance, as here shown one-fourth its limit of movement. The small section of the drag-plate 46, which is at the end, as shown in Fig. 8, is similarly moved by another lug 65, so that such section is not moved until the preceding section has been moved one-fourth and the long section has moved one-half its limit. To limit the movement of the drag-plate, a bolt 66 is secured in the twister-plate 5 and extends up through the slots 67 in the small sections of the drag-plate 46. This permits the sections of the drag-plate to be moved to the end of the slots. The lower drag-plate 44 is similarly arranged and controlled, although its construction is not fully shown.

The guide-plates 68, which are bolted to the twister-plates 5, hold down and guide the plate 64 and the drag-plate 46. The drag-plate 46 is shifted or reciprocated through the arm 69, which is pivotally connected with the compound connecting-rod 70, which in turn is connected to the lever 72, which has a rigid arm 92, which is pivoted to a connecting-rod 73, which is pivoted to a crank 95, rigidly secured on the shaft 74, that is mounted in the end frame and has on its lower end a bevel-pinion 75, that meshes with a mutilated bevel-gear 76, secured on the end of the shaft 14, which extends entirely through the machine. It is observed that the mutilated gear 76 is on the same shaft as the mutilated gear 13, but they are in such position with relation to each other that the pinion 75 is actuated while the pinion 15 is not being actuated, and then while the pinion 15 is actuated pinion 75 is at rest, whereby the actuation of the twister-wheels and wire-twisters alternates with the shifting of the drag-plates to change the position of the wire-twisters. The lower drag-plate 44 is shifted similarly and simultaneously with the upper drag-plate 46 by means of the shaft 85, that is secured rigidly to the lever 72 above and rigidly to the crank-arm 86 below, which is pivoted to the connecting-rod 87, that is similar to the connecting-rod 70, and the rod 87 is pivoted to the arm 88, that is rigidly secured to the drag-plate 44 and corresponds to the arm 69 on the drag-bar 46. The shaft 85 has bearings 89 on the end frame of the machine, as shown in Fig. 4.

Figures 15, 16:
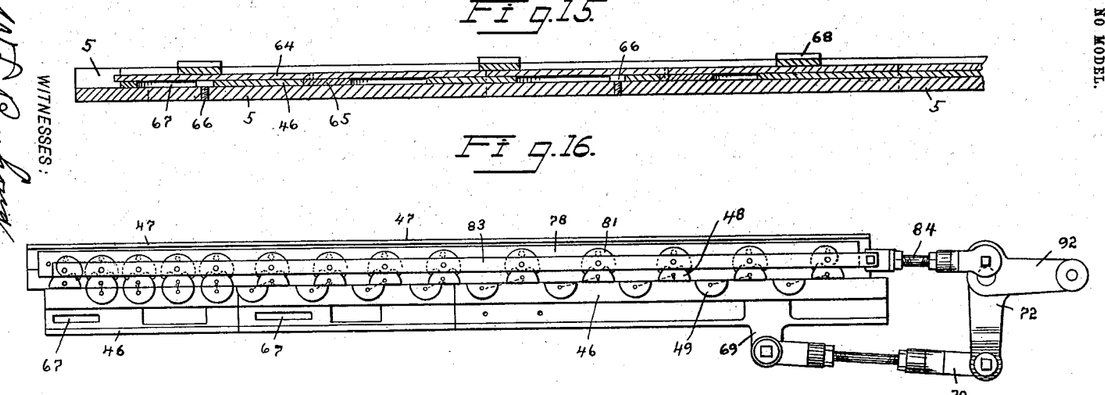
Fig. 15 is a vertical longitudinal section on the line 15 15 of Fig. 8.
Fig. 16 is a plan view of the means for holding the strands of running-wire straight while being woven.

Since the part 41 at the lower end of the spool-holder 42 is curved to fit in a circular bearing, it must be guided during the lateral shifting of the wire-twister and spool-holder, as has been explained. Such guidance is effected by the rib 40, resting in and moving through the notches 39 on the upper surfaces of the twister-wheels 34 and the notches 76 in the studs 77, that are cast fast to the twister-plate 6 and extend and fit between the twister-wheels 34. Therefore when the grooves 39 in the twister-wheels register with the grooves 76 in said studs they form a continuous groove through which the ribs 40 on the lower ends of the spool-holders pass or move in crossing the wires. The gearing which drives the wheels 34 causes their rotation first in one direction and then in the opposite direction and is such as to bring the grooves 39 in alinement with the grooves 76 at the end of each operation. In this particular part of the machine there is no difference in the construction herein shown and that shown in my former patent, especially in Fig. 7 thereof. As shown in Figs. 6 and 16 herein, the shifting of the spool-holders and wire-twisters has been about one-half accomplished, the section to the left not yet having been moved. It may be added also that in the figures the wires of the fence are all indicated in dotted lines.

Figure 17:
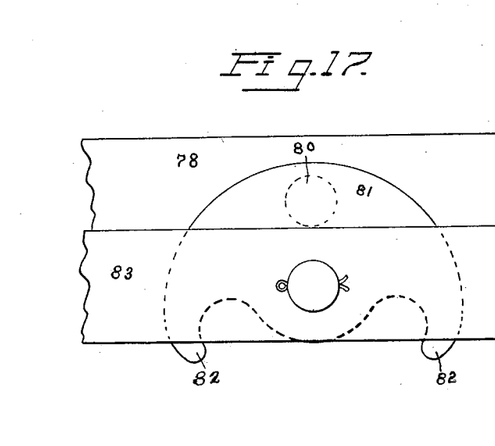
Fig. 17 is a plan in detail of a part of the wire-holding means shown in Fig. 16 and enlarged.
Figure 18:
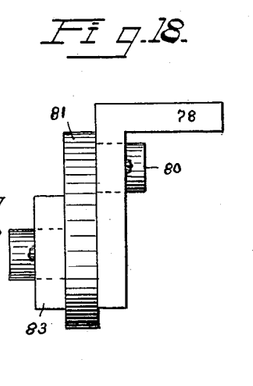
Fig. 18 is an end view of the same.

In order to prevent the running-wires 54, which extend vertically over the reel 60, from being deflected or moved out of line either to the right or left by the pull of the wire 52 near the spool-holders and parts 49 of the wire-twister, as has been explained, I provide the mechanism shown in Figs. 16 and 17 to catch said running-wires and hold them straight. It consists of the horizontal plate 78, that is mounted above the twister-plate 5, as shown in Fig. 6, by means of the screw-bolts 79, whereby the position of the plate 78 may be vertically adjusted with relation to the twister-plate 5 and the wire-twisters mounted therein. Upon said plate 78 I pivot at 80 a number of wire-holding disks 81, which have on one side a pair of oppositely-extending fingers 82, which extend on each side of the running-wires 54 and limit the displacement or movement laterally of said wires. In order to maintain said wires absolutely straight against sidewise strain, the disks 81 are operative by the bar 83, pivoted thereto, the connecting-bar 84, and the lever 72. Since the bar 84 is pivotally connected to one end of the arm 92 on the lever 72, as the connecting-rod 70 is pivotally connected with the other end of the lever 72, it is obvious as the wire-twisters, spool-holders, &c., carrying the cross-wires are being shifted the wire-holding disks 81 will be oscillated, so as to move one of the fingers 82 thereof in a direction opposite the pull exerted on the running-wires by the cross-wires and will engage the running-wires and prevent their lateral displacement under the sidewise strain of the cross-wires. When the cross-wires and their holders, including the twisting-wheels, spool-holders, and wire-twisters, are moved back into their original position, the wire-holding disks 81 move in the opposite direction and the other fingers 82 thereon engage the running-wires and prevent them from lateral displacement during such reverse movement of the parts. While such means are herein shown in connection with a particular machine, they can be used in any sort of wire-weaving machine for the same purpose. It accomplishes the work heretofore accomplished in wire-weaving machines by the star wire-holding devices. This improved apparatus in its broader features is contained and covered in a separate application by me filed June 13, 1902, Serial No. 111,522.

The reeling apparatus is substantially the same as that shown in my application for a patent above mentioned. The reel 63 is driven by the ratchet-wheel 101 and the connecting-bar 108, which is pivoted to the side of the wheel 12 by the wrist-pin 109. The bar 108 is pivotally mounted by the pivot-pin 112, that works in a vertical slot in a rock-shaft 106. Said rock-shaft is pivoted at the lower end to the main shaft of the reel and carries pawls 110, that engage and drive the wheel 101 as the upper part of the rock-shaft 106 is moved forward. The wheel 101 is prevented from rear movement by the pawls 102. The rapidity of rotation or movement of the reel is controlled by the hand-lever 105 at the left outer end of the bar 120, pivoted at its end to the bar 103, so as to elevate the pin 112 in the slot in the rock-shaft. It is held in position by the rack 115. The higher the pin 112 is elevated the less will be the movement of the reel, as is more fully explained in my former application. The outer end of the connecting-bar 103 is connected to the bar 103 on the other end of the machine by a pipe 104. Said pipe rests upon the fence coiled on the reel, and consequently the increase in the diameter of the coil of wire on the reel elevates the pipe 104, and therefore the pin 112, so as to make the movement of the reel agree with the feed of the fence being woven as the diameter of the coil of fence increases on the reel. The inner ends of bars 103 are secured to the pipe 111, surrounding shaft 14.

The machine is driven by the belt 100, running over the pulley 8.

What I claim as my invention, and desire to secure by Letters Patent, is—

1. In a wire-fence-weaving machine, means for guiding the running-wires of the fence, spool-holders mounted parallel with the running-wires and having a plate adjacent said running-wires that is convex on the side next to the running-wires, and means for revolving the spools around the running-wires.

2. In a wire-fence-weaving machine, means for guiding the running-wires of the fence, a spool-holder mounted parallel with a running-wire having a wire wound on the spool thereof, a semicircular wire-twister secured to one end of the spool-holder with a passage-way therethrough for the wire from the spool of said holder, a bearing concentric with the running-wire, and means for revolving the spool-holder and semicircular wire-twister around said running-wire.

3. In a wire-fence-weaving machine, means for guiding the running-wires, wire-twisters formed of two semicylindrical halves with a vertical opening through each, a cross-wire passing through one section of the wire-twisters and a running-wire through the other section, a bearing for said wire-twisters formed of two adjacent plates, one stationary with semicylindrical notches therein to receive the section of the wire-twisters through which the running-wires pass, and the other a drag-plate having similar notches therein to receive the sections of the wire-twisters through which the cross-wire extends, means for moving said drag-plate so as to shift the sections of the wire-twisters carrying the cross-wires into juxtaposition with the next adjacent sections of the wire-twisters carrying the running-wires, and means for rotating said wire-twisters.

4. In a wire-fence-weaving machine, means for guiding the running-wires of the fence, spool-holders parallel with said running-wires with a semicircular bearing at each end, the bearing at the upper end being a wire-twister having a passage-way through it for the wire on the spool of each spool-holder, a semicircular wire-twister through an opening in which the running-wire passes and with its flat side adjacent the flat side of the wire-twister on the spool-holder so that combined they make an annular journal for the upper end of the spool-holder, bearings for the lower and upper journals of said spool-holders each formed of a stationary plate having semicircular bearing-notches therein and a drag-plate having corresponding semicircular bearing-notches, said bearing-notches forming bearings for the wire-twisters on the upper ends of the spool-holders and the journals on the lower end thereof, means for revolving the spool-holders about the running-wires so that at the end of such revolution the journals of the spool-holders will rest in the notches in the drag-plates and the parts of the wire-twister through which the running-wires extend rest in the notches in the stationary plate, and means for shifting laterally said drag-plates so that the spool-holders will be moved from one bearing to the next adjacent bearing.

5. In a wire-fence-weaving machine, the combination of the twisting-plate 5, the plate 47 secured thereto having a series of semicircular bearing-notches therein, the drag-plate 46 longitudinally mounted on the plate 5 having semicircular notches therein that correspond with the notches in the plate 47, a plate 64 secured to one section of the drag-plate 46, means for holding said plate 64 and drag-plate in position on the plate 5, means for longitudinally moving the plate 64 and the section on the drag-plate secured thereto, blocks 65 secured on the under side of said plate 64, recesses in the free sections of the drag-plate 46 for the movement of the block 65, said recesses being of such length as to cause said section of the drag-plate to move after the preceding section has been partially moved, and a stop to limit the movement of the drag-plate.

6. In a wire-fence-weaving machine, the combination with means for weaving cross-wires with running-wires, of engaging wheels between which the running-wires pass and by which they are held taut, and means for drawing the running-wires through the wheels and weaving-machine.

7. In a wire-fence-weaving machine, the combination with means for weaving cross-wires with running-wires, of a series of crimping-wheels through which the running-wires pass and by which they are held taut, said wire-crimpers consisting of two coöperative wheels, the similar wheels for the sets of the wire-crimpers being mounted on a single shaft so that the running-wires will be subjected to the same tension, and means for drawing the running-wires through the crimping-wheels and weaving-machine.

8. In a wire-fence-weaving machine, a series of spool-holders for holding the cross-wires, means for guiding the running-wires, a roller over which the wire fence is drawn after it is woven, means for holding the running-wires taut, means for shifting the spool-holders to and fro between the pairs of running-wires, means for revolving the spool-holders about the running-wires, a series of oscillatory disks with points adapted to engage and hold the running-wires to prevent them from being wound by the pull of the cross-wires, and means for oscillating said disks so that a finger thereof will be moved in a direction opposite to the movement of the corresponding spool-holder.

In witness whereof I have hereunto affixed my signature in the presence of the witnesses herein named.

GEORGE W. WHITTINGTON.

Witnesses:
V. H. LOCKWOOD,
NELLIE ALLEMONG.